(12) United States Patent
Hohmeier et al.

(10) Patent No.: US 6,321,616 B1
(45) Date of Patent: Nov. 27, 2001

(54) GEAR CATCHING FOR A SHIFT TRANSMISSION

(75) Inventors: Jürgen Hohmeier, Echte; Arnd Bürger, Einbeck, both of (DE); Grant A. Webb, Howell, MI (US)

(73) Assignee: United Parts FHS Automobil Systeme GmbH, Dassel (DE)

( * ) Notice: Subject to any disclaimer, the term of this patent is extended or adjusted under 35 U.S.C. 154(b) by 0 days.

(21) Appl. No.: 09/450,199

(22) Filed: Nov. 29, 1999

(30) Foreign Application Priority Data

Nov. 27, 1998 (DE) ............................................. 198 54 858
Mar. 6, 1999 (DE) ............................................. 199 09 965

(51) Int. Cl.⁷ .................................................. F16H 63/38
(52) U.S. Cl. ................................... 74/473.28; 74/473.34; 74/527; 403/90
(58) Field of Search ........................... 74/473.27, 473.28, 74/473.34, 473.35, 527; 403/90

(56) References Cited

U.S. PATENT DOCUMENTS

| | | | |
|---|---|---|---|
| 3,679,846 | * 7/1972 | Dillon et al. .......................... | 200/6 A |
| 3,691,788 | * 9/1972 | Mazziotti ............................ | 403/90 X |
| 3,841,769 | * 10/1974 | Bowerman .............................. | 403/90 |
| 3,957,241 | * 5/1976 | Morris et al. ....................... | 403/90 X |
| 5,897,417 | * 4/1999 | Grey .................................... | 403/90 X |
| 6,034,336 | * 3/2000 | Lee .................................... | 200/6 A X |

FOREIGN PATENT DOCUMENTS

| | | |
|---|---|---|
| 196 23 093 | 12/1997 | (DE) . |
| 702 172 | 3/1996 | (EP) . |
| 703 395 A1 | 3/1996 | (EP) . |
| 790 418 A1 | 8/1997 | (EP) . |

* cited by examiner

*Primary Examiner*—Allan D. Herrmann
(74) *Attorney, Agent, or Firm*—Cohen, Pontani, Lieberman & Pavane

(57) ABSTRACT

A gear catching for a shift transmission in a motor vehicle including a rotatably mounted shift lever and bearing. The catching includes a substantially spherical body having at least one cam at the shift lever or a bearing shell enclosing it. The cam catches in a catch cam. The catch cam or cam is constructed in a springing manner and, due to catching, gives the driver a clear sense of shifting.

18 Claims, 3 Drawing Sheets

GEAR CATCHING FOR A SHIFT TRANSMISSION

BACKGROUND OF THE INVENTION

1. Field of the Invention

The invention is directed to a gear catching for a shift transmission in a motor vehicle.

The invention is applicable to the construction of shift transmissions for vehicles and in order to allow the driver a clear sense of shifting in spite of extensive damping of the shifting, for example, by rubber elements.

2. Discussion of the Prior Art

Due to the construction of the outer shift transmission with push-pull cables and because of the increased damping by means of rubber elements, the driver does not have a clear sense of shifting, that is, the driver has no definite sense that a gear has been engaged. In order for the driver to have this feeling, it is necessary to arrange, in addition, a gear catching at the shift transmission.

European reference EP 0 702 172 A1 describes a gear catching using a spring-loaded pressure piece which moves relative to a contour and engages therewith. The pressure piece which forms a ball is tensioned by a spring and accordingly snaps into the contour. This solution is disadvantageous due to the large quantity of individual parts which are not arranged directly at the shift lever. In addition, it is necessary to provide intermediate elements which are subject to tolerances and play and therefore do not allow the driver to perceive the catching in a clear manner.

German reference DE 196 23 093 A1 describes a gear catching for a shift transmission in vehicles comprising a shift lever, a bearing and positioning stops, wherein a catch hoop is mounted so as to be rotatable about the bearing of the shift lever and the positioning stops. The catch hoop is formed of two spring elements with catch contours. The spacing between the spring elements is adapted to the diameter of the shift lever in such a way that the friction of the shift lever is low. While this solution allows the driver a good sense of shifting, it comprises a series of individual parts which interact with one another and the assembly of the individual parts increases costs.

SUMMARY OF THE INVENTION

Accordingly, it is an object of the invention to provide a gear catching which does not have the disadvantages of the prior art and which gives the driver a clear sense of shifting.

In the solution according to the invention, the gear catching for a shift transmission in motor vehicles comprising a shift lever which is rotatably mounted at a substantially spherical body in the bearing shell has at least one cam. According to the invention, at least one cam is arranged either on the spherical body or on the bearing shell and engages in catch cams, wherein either the cam or the catch cams are supported by spring elements.

According to the invention the catch cam, cam and spring element are arranged directly on the spherical body or on the bearing shell and do not have additional elements in addition to or outside of these elements.

Basically, the invention can advantageously be constructed by means of the following arrangements:

one or more cams are arranged on the spherical body and engage in the spring-mounted catch cams of the bearing shells;

one or more cams are arranged in a springing manner on the spherical body and engage in the rigid catch cams of the bearing shells;

one of more cams are fixedly arranged in the bearing shells and engage in the springing catch cams which are arranged on the ball; and one or more cams are arranged on the bearing shells in a springing manner and engage in the rigid catch cams on the ball.

The bearing shells are advantageously positioned in a housing. Ideally, the spherical body can be a ball which can comprise two parts and which is mounted from two sides around the shift lever. However, this ball can also be formed in one piece and can be incorporated in the shape of the shift lever.

The ball is advantageously made of an elastic material such as plastic, for example. However, more wear-resistant materials such as metals or nonmetals are also possible, wherein a surface coating or surface treatment of the ball with the cam can be advantageous.

It is advantageous that one or more cams are arranged along portions of the circumference of the ball or bearing shell or continuous around the circumference thereof, wherein the ball with the cam can be formed of one or more parts. It is crucial that the ball or bearing shell with the cam snaps into or snaps out of the catch cams of the spring element during movement of the shift lever, which gives the driver a clear sense of shifting.

It is necessary that the bearing shell likewise has a substantially spherical shape which must be open at the top and bottom so that the shift lever can penetrate through it. The bearing shell can be constructed in one part.

The bearing shell forms the counter-piece to the cams at the ball of the shift lever by means of one or more spring elements, including catch cams, which are integrated in the shell. Aside from the one-part construction of the bearing shell in which the spring elements are a component part of the bearing shell, a multiple-part construction is also possible, wherein the spring elements are inserted in the bearing shell or shift housing as separate parts.

Further, in another embodiment of the invention the catch cams of the spring elements extend so that they enable catching with the cam at the ball of the hand shift lever or bearing shell in every gear Considered in cross section through the catch cams of the spring elements, the contour is similar to a toothing, so that the cams of the spherical body, for example, can snap in and snap out in order to give the driver a noticeable sense of shifting.

Both the bearing shell and spring elements should be made of elastic material, preferably plastic, wherein more wear-resistant materials such as metals or nonmetals with or without a surface treatment or coating can also be beneficial to functioning, especially as regards the spring elements.

In a further embodiment, the housing is constructed so that it includes the bearing shell in its own shape, so that a separate bearing shell need not be inserted into the housing. This applies in particular to constructions in which the housing is made of plastic or some other elastic material and bearing shells can easily be simultaneously arranged in the casting mold or injection mold.

Insofar as the spherical body carries the cam or catch cams as spring elements or with spring elements, it is possible to provide the elastic ball with recesses which enable an elastic deflection or springing of the catch cam or cam. But it is also possible to arrange the cam or catch cams with spring elements on the spherical body.

The solution according to the invention has the advantage that a gear catching can be manufactured from few parts and economically in terms of assembly while giving the driver a clear sense of shifting.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
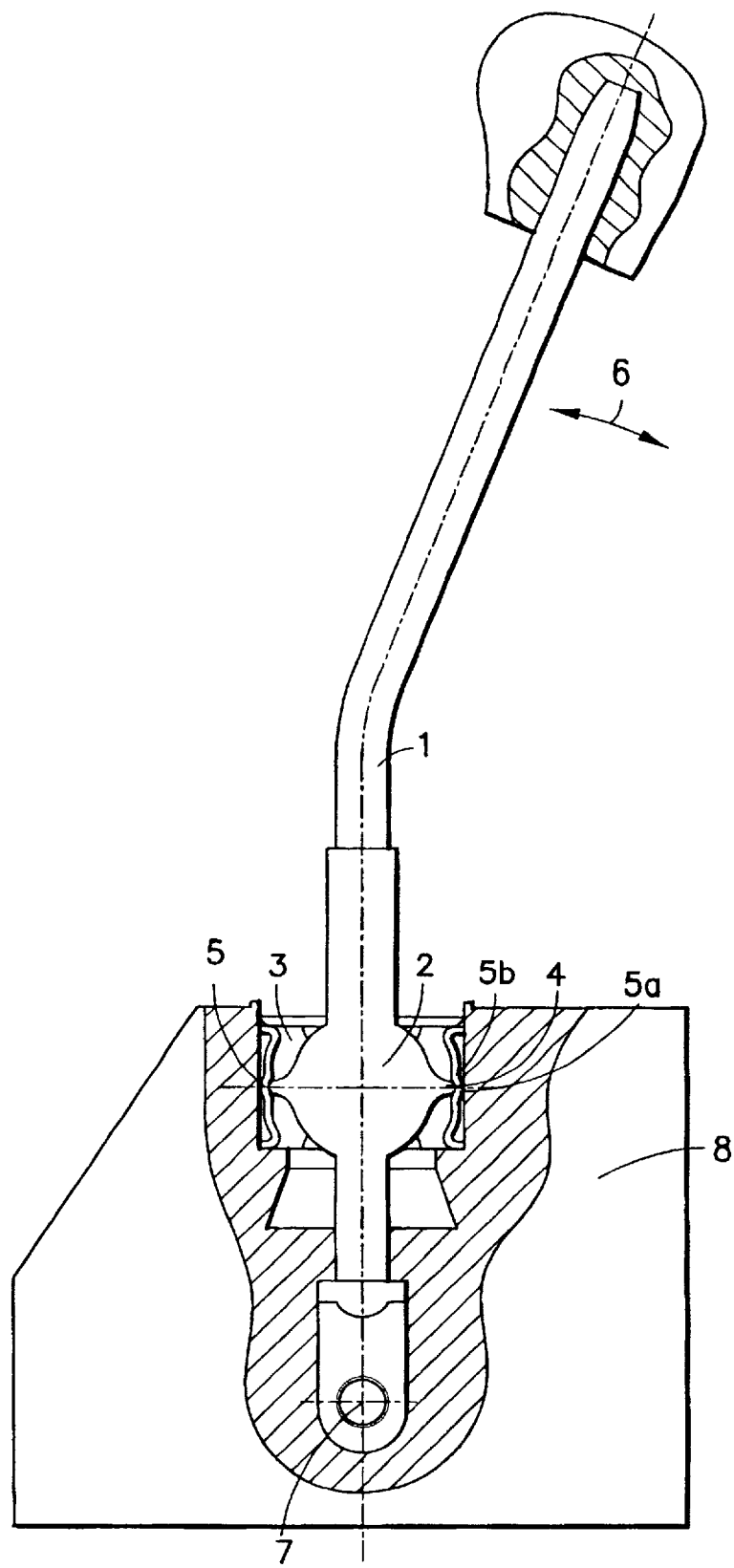
FIG. 1 shows the gear catching according to the invention in which the cams are arranged on the ball.

FIG. 1 is a sectional view of a gear catching according to the invention at a shift lever 1. A ball 2 is arranged in the shape of the shift lever 1 and has cams 4 at both sides, these cams 4 being received by the catches 5*a* of the spring elements 5 of the bearing shell 3. The cable pull connection 7 is movable about the bearing of the ball 2 in a movement direction 6, wherein the cable pulls are actuated by this movement.

The bearing shell 3 is received in a housing 8. When a shifting movement takes place, the cams 4 of the ball 2 must be moved over the catch cams 5*b* of the spring elements 5. In this way, the driver has a sense of shifting from one gear to another. When the cams 4 of the ball 2 have overcome the tips of the catch cams 5*b* at the spring elements 5, the shift lever 1 automatically jumps to the desired gear.

Figure 2:
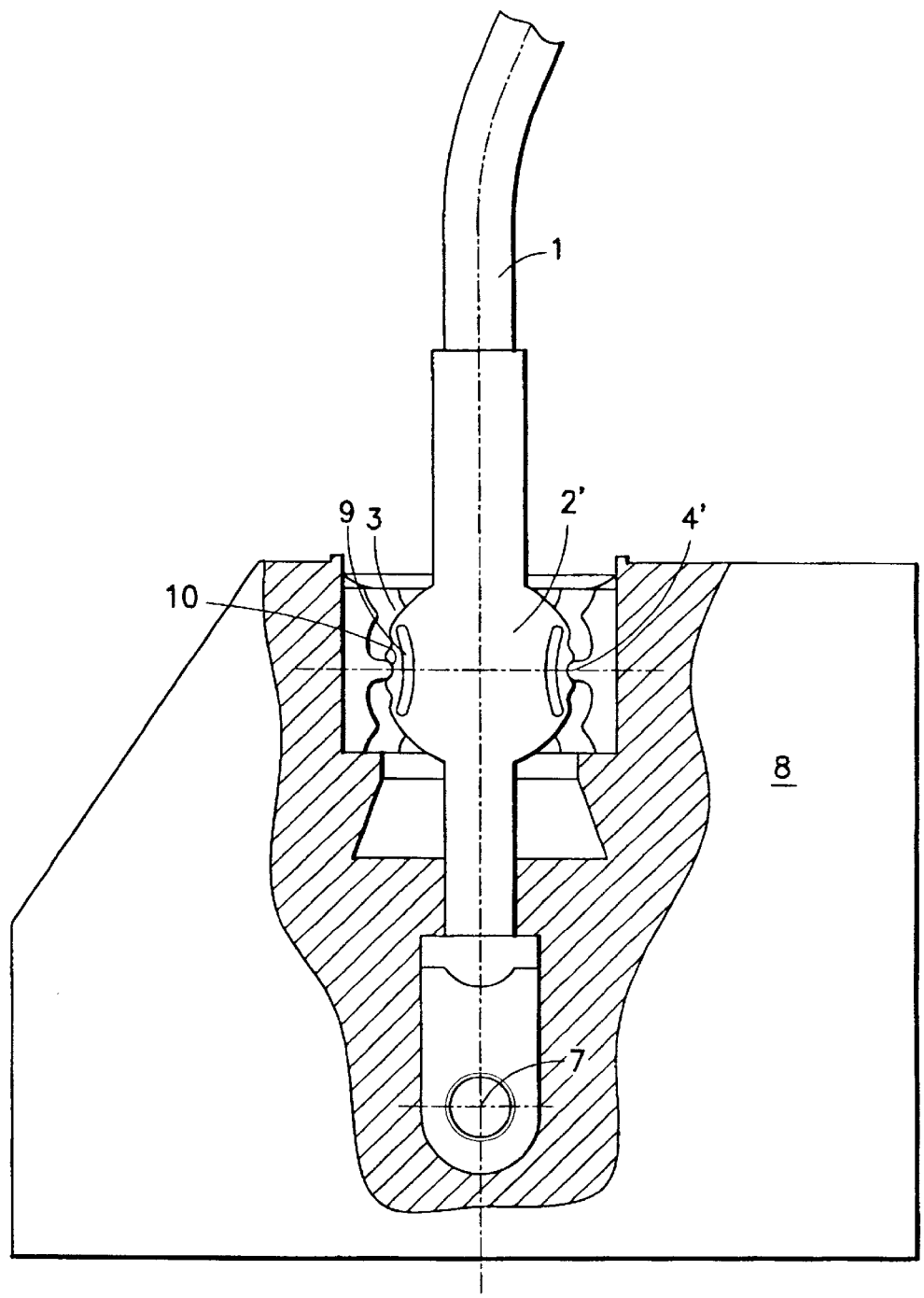
FIG. 2 shows the gear catching according to the invention in which the cams are arranged at the bearing shell and engage in the springing catch cams of the ball.

FIG. 2 shows an example in which a ball 2' having recesses 9 in its material is arranged at the shift lever 1. These recesses 9 provide for a springing arrangement of the ball 2', especially the catch cams 10. The cams 4' are arranged on the stiff bearing shells 3 and engage in the catch cams 10.

Figure 3:
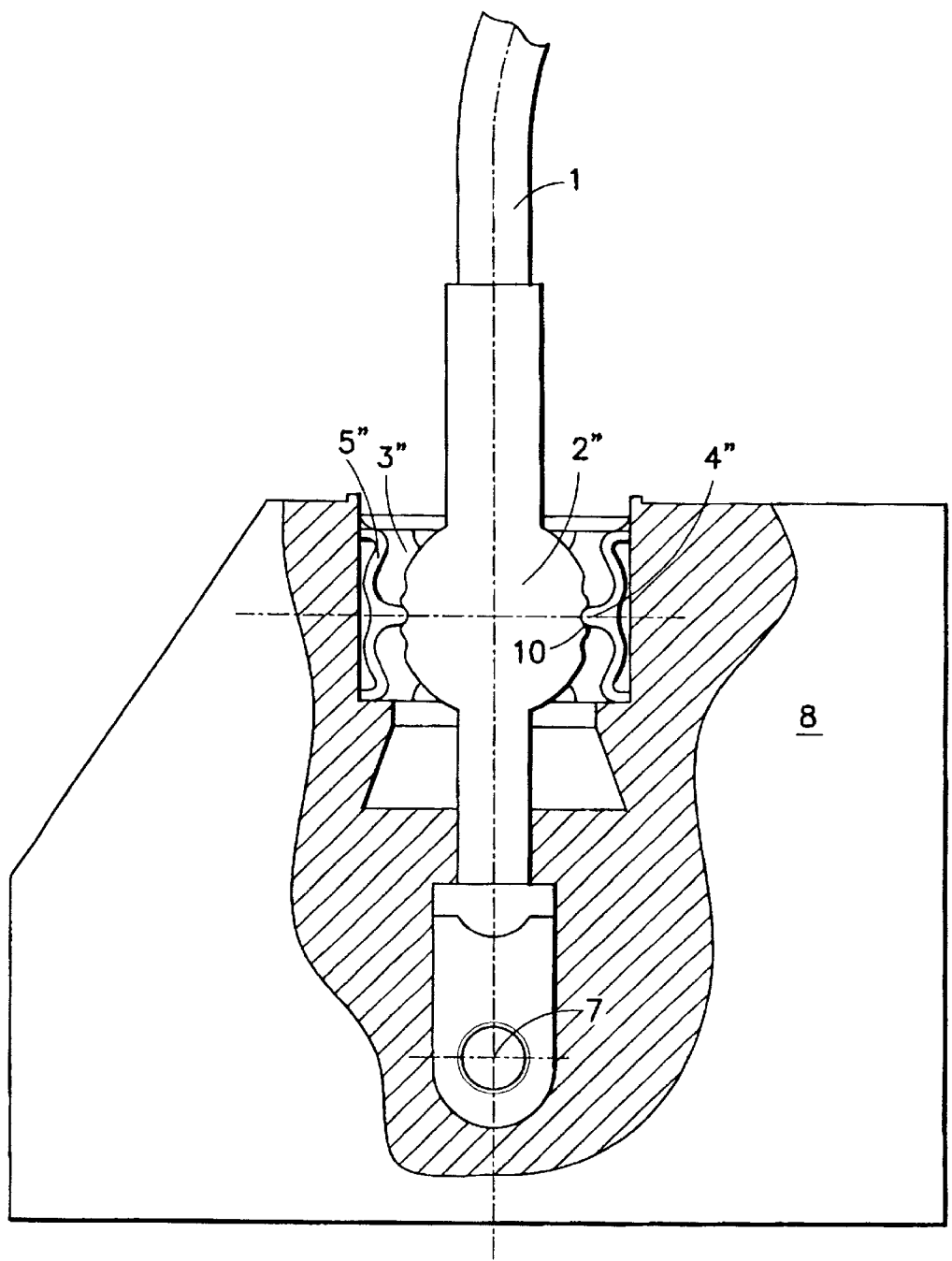
FIG. 3 shows the gear catching according to the invention in which the springing cams are arranged in the bearing shell and engage in the stiff catch cams of the ball.

Another variant of the solution according to the invention is shown in FIG. 3 in which a spring element 5" carries the cam 4" which is arranged in the bearing shell 3" and acts on the ball 2" and the catch cams 10 arranged thereon.

The invention is not limited by the embodiments described above which are presented as examples only but can be modified in various ways within the scope of protection defined by the appended patent claims.

We claim:

1. A gear catching for a shift transmission in a motor vehicle, comprising: a bearing shell; substantially spherical body rotatably mounted in the bearing shell; a shift lever mounted to the spherical body; and, at least one cam, spring elements and catch cams cooperatively arranged so that the cam catches in different shift positions so as to only tactually indicated the shift positions without holding the shift lever in the shift positions, one of the cam and the spring elements, with the catch cams, being arranged one of directly on the substantially spherical body and at the bearing shell.

2. A gear catching according to claim 1, wherein at least one cam is arranged at the spherical body which is arranged in the bearing shell with the spring elements which have the catch cams.

3. A gear catching according to claim 1, wherein the catch cams are rigid on the bearing shell, the cam being mounted in a springing manner on the spherical body so as to catch in the rigid catch cams of the bearing shell.

4. A gear catching according to claim 1, wherein the catch cams are arranged on the spherical body in a springing manner, the cam being arranged in the bearing shell so as to catch in the springing catch cams of the spherical body.

5. A gear catching according to claim 1, wherein the cam is combined with the spring elements and arranged in the bearing shell so as to engage in stiff catch cams of the spherical body.

6. A gear catching according to claim 1, and further comprising a housing, the bearing shell being positioned in the housing.

7. A gear catching according to claim 1, wherein a number of the cams are arranged along portions of a circumference of the spherical body.

8. A gear catching according to claim 6, wherein the bearing shell is a component part of the housing.

9. A gear catching according to claim 1, wherein the spherical body and the cam are made of one of an elastic material and a wear-resistant material.

10. A gear catching according to claim 9, wherein the spherical body and the cam are made of plastic.

11. A gear catching according to claim 9, wherein at least one of the spherical body and the cam is made of metal.

12. A gear catching according to claim 1, wherein the spherical body and the cam are formed of at least one part.

13. A gear catching according to claim 1, wherein the bearing shell has a substantially spherical shape which has an open top and bottom.

14. A gear catching according to claim 1, wherein the spring element is a component part of the bearing shell.

15. A gear catching according to claim 1, wherein the bearing shell is constructed of at least one part.

16. A gear catching according to claim 2, wherein the bearing shell with the spring elements is made of one of an elastic material and a wear-resistant material.

17. A gear catching according to claim 16, wherein the bearing shell with the spring elements is made of plastic.

18. A gear catching according to claim 16, wherein the bearing shell with the spring elements is made of metal.

* * * * *